US005451160A

United States Patent [19]
Becker

[11] Patent Number: 5,451,160
[45] Date of Patent: Sep. 19, 1995

[54] BURNER CONFIGURATION, PARTICULARLY FOR GAS TURBINES, FOR THE LOW-POLLUTANT COMBUSTION OF COAL GAS AND OTHER FUELS

[75] Inventor: Bernard Becker, Mülheim, Germany

[73] Assignee: Siemens Aktiengesellschaft, Munich, Germany

[21] Appl. No.: 142,205

[22] Filed: Oct. 25, 1993

[30] Foreign Application Priority Data

Apr. 25, 1991 [DE] Germany .................. 41 13 580.6

[51] Int. Cl.⁶ .............................................. F23Q 9/00
[52] U.S. Cl. ...................................... 431/284; 431/183; 431/8
[58] Field of Search .............. 431/183, 278, 284, 283, 431/285, 354, 353, 350, 8, 9

[56] References Cited

U.S. PATENT DOCUMENTS

| | | | |
|---|---|---|---|
| 3,846,062 | 11/1974 | Quinn | 431/116 |
| 4,701,124 | 10/1987 | Maghon et al. | 431/284 |
| 5,062,792 | 11/1991 | Maghon | 431/284 |
| 5,066,221 | 11/1991 | Becker | 431/280 |
| 5,099,644 | 3/1992 | Sabla et al. | 60/749 X |

FOREIGN PATENT DOCUMENTS

| | | |
|---|---|---|
| 0193838 | 9/1986 | European Pat. Off. . |
| 0276696 | 8/1988 | European Pat. Off. . |
| 198404 | 12/1957 | Germany .................. 431/182 |
| 1537958 | 1/1190 | U.S.S.R. . |
| 1138601 | 2/1985 | U.S.S.R. . |
| 1458651 | 2/1989 | U.S.S.R. . |
| 8908803 | 9/1989 | WIPO . |

OTHER PUBLICATIONS

The Development of Integrated Coal-Gasification Combined Cycle . . . , John S. Joyce, pp. 2-6.

Primary Examiner—Carl D. Price
Attorney, Agent, or Firm—Herbert L. Lerner; Laurence A. Greenberg

[57] ABSTRACT

A burner configuration includes approximately concentrically disposed annular conduits for delivering various operating media. A plurality of outlet nozzles admix a gaseous medium or a liquid medium in finely distributed form with an air flow flowing in an approximately conically tapering outer annular-conduit air delivery system. A further annular conduit on an inflow side discharges into the annular-conduit air delivery system above the outlet nozzles.

16 Claims, 2 Drawing Sheets

| Medium | | | | (Pilot Burner) | | | Burner Operating Mode |
|---|---|---|---|---|---|---|---|
| A | B | C | D | E | F | G | |
| Air | Natural gas | – | – | Air | (Natural) gas | – | Natural gas pre-mixing burner |
| Air | – | Oil | – | Air | – | Oil | Oil premixing burner |
| Air | – | – | Coal gas | Air | (Coal) gas | – | Coal gas diffusion burner |
| Air | Natural gas | Water | – | Air | (Natural) gas | – | Natural gas pre-mixing burner with supplemental NOX reduction |
| Air | Steam | – | Coal gas | Air | (Coal) gas | – | Coal gas premixing burner with supplemental NOX reduction |
| Air | – | Water | Coal gas | Air | (Coal) gas | – | Coal gas premixing burner with supplemental NOX reduction |
| Air | Steam | Oil | – | Air | – | Oil | Oil premixing burner with supplemental NOX reduction |

FIG. 2

BURNER CONFIGURATION, PARTICULARLY FOR GAS TURBINES, FOR THE LOW-POLLUTANT COMBUSTION OF COAL GAS AND OTHER FUELS

CROSS-REFERENCE TO RELATED APPLICATION

This application is a Continuation of International Application Serial No. PCT/DE92/00303, filed Apr. 13, 1992.

BACKGROUND OF THE INVENTION

1. Field of the Invention

The invention relates to a burner for fluid fuels, particularly oil, natural gas and/or coal gas, of the kind used for gas turbines.

In view of the worldwide efforts to lower the emissions of pollutants from furnace systems, in particular gas turbines, burner configurations have been developed in recent years that have especially low emissions of nitrogen oxides (NOX). Often, emphasis is placed on the capability of such burners to function with not merely a single fuel, but rather with the most varied possible fuels, such as oil, natural gas and/or coal gas, selectively or even in combination, in order to increase the reliability of a fuel supply and flexibility in operation. Such burners are described in European Patent No. 0 276 696 B1, for example.

One problem in constructing burners for all possible, different operating conditions and fuels is that the volumes of the various fuels required for operation in a given case are completely different, which makes it difficult to use the same delivery system and the same injection openings for all fuels. It is therefore known in the prior art to use different delivery systems for liquid and gaseous substances. However, another problem arises then if selective gaseous fuels with completely different specific gross calorific values, such as natural gas and coal gas, are to be used. The completely different volumetric situations when those two fuels are used, and the different chemical processes in their combustion, require modification or expansion of the known systems.

In a published paper entitled "The Development of Integrated Coal-Gasification Combined-Cycle (ICG-GUD) Power Plants" by John S. Joyce, read on Apr. 26, 1990 in Arnheim (a written version was distributed), FIG. 4 describes a burner that is selectively suitable for combusting natural gas or gas with a low specific gross calorific value. In that configuration, however, there is a diffusion burner for both fuels, which in the case of operation with natural gas leads to higher NOX emissions than would be the case with a premixing burner.

SUMMARY OF THE INVENTION

It is accordingly an object of the invention to provide a burner configuration, particularly for gas turbines, for the low-pollutant combustion of coal gas and other fuels, which overcomes the hereinafore-mentioned disadvantages of the heretofore-known devices of this general type, which is suitable for combusting both burnable gas with a low gross calorific value and a diffusion flame and burnable gas with a high gross calorific value, and/or for combusting oil in a premixing mode. The operational reliability of the known configurations should be preserved, and the additional expense for equipment should be low. The systems should not mutually have any negative impact on the quality of combustion, and in particular undesired flame development at turbulence points in the system upstream of the actual combustion zone should be avoided.

With the foregoing and other objects in view there is provided, in accordance with the invention, a burner configuration, comprising approximately concentrically disposed annular conduits for delivering various operating media; an approximately conically tapering outer annular-conduit air delivery system; a plurality of outlet nozzles for admixing a gaseous medium or a liquid medium in finely distributed form with an air flow flowing in the annular-conduit air delivery system; and a further annular conduit on an inflow side discharging into the annular-conduit air delivery system above the outlet nozzles.

The invention is based on the recognition that in the combustion of burnable low-BTU gas, none of the special provisions for lowering the pollutant emissions are necessary, since very high flame temperatures do not occur when such gases are combusted, and therefore NOX formation remains virtually insignificant. It is therefore sufficient to create a further simple delivery system, but care must be taken to assure that this system will neither negatively impact the other systems, nor reduce the operational reliability of the other systems. It is therefore important for the further annular conduit to discharge on the inflow side above the outlet nozzles for the other fuels. In this way, an ignitable mixture cannot reach the further annular conduit if the burner is supplied with fuel of a different type through the outlet nozzles.

In accordance with another feature of the invention, the further annular conduit conforms to the other annular conduits for delivering the operating media, so that the further annular conduit discharges on the inside into the annular-conduit air delivery system.

In accordance with a further feature of the invention, the supplemental delivery system for a further fuel may in particular be combined with an annular-conduit air delivery system, which has a system of swirl vanes on the downstream side, below or inside which outlet nozzles for a liquid medium are disposed. Alternatively or additionally, a combination with a plurality of outlet nozzles for a gaseous medium is possible. It is especially advantageous to provide the outlet nozzles for a gaseous medium in the swirl vane system itself.

Therefore, in accordance with an added feature of the invention, the swirl vanes are constructed as hollow vanes and are connected to a delivery system for a gaseous medium. A plurality of outlet nozzles at the swirl vanes, which are preferably oriented approximately perpendicularly to the locally prevailing flow direction at any given time, enables uniform admixture of a gaseous medium with the air flow. In addition, nozzles of various diameters, enabling the range of the emerging streams to be correspondingly varied, may also be used.

In accordance with an additional feature of the invention, the primary application for utilizing the further annular conduit is the delivery of a burnable gas with a low specific gross calorific value (low-BTU gas), in particular coal gas.

In accordance with yet another feature of the invention, the annular-conduit air delivery system and the further annular conduit in principle form a diffusion burner for combusting low-BTU gas with air.

Although a certain premixing does occur over the relatively long distance to the actual combustion zone, nevertheless it is not of the extent known with premixing burners. In particular, from directly downstream of the mouth of the further annular conduit to the region of the swirl vane system, undesired ignition of any mixture of air and burnable gas that may possibly have arisen need not be expected.

In accordance with yet a further feature of the invention, the outlet nozzles and the further annular conduit have means for preventing recirculation of at least one of the gaseous and liquid media into the further annular conduit.

In accordance with yet an added feature of the invention, the further annular conduit discharges directly above the swirl vane system, for preventing ignition in the vicinity of the swirl vane system.

In accordance with yet an additional feature of the invention, the gaseous medium is natural gas or water vapor and the liquid medium is oil or water. The main operating modes of a burner according to the invention can be found in a table given in FIG. 2. In principle, combinations of the primary operating modes shown therein are also possible.

In accordance with a concomitant feature of the invention, there are provided approximately concentrically disposed inner delivery conduits for delivering air and at least one of gaseous fuel and liquid fuel to produce a pilot flame stabilizing a flame of the entire burner configuration.

It should be noted that in order to stabilize the combustion flame in the burner configurations according to the invention, a pilot burner system, which maintains a central stable flame, as is known in various forms in the prior art, will generally be required. Any known pilot burner system is suitable for this purpose, but naturally it is especially preferred that the pilot burner be operable with the same fuel as the main burner. This is also shown in the table.

Other features which are considered as characteristic for the invention are set forth in the appended claims.

Although the invention is illustrated and described herein as embodied in a burner configuration, particularly for gas turbines, for the low-pollutant combustion of coal gas and other fuels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a table showing primary options for operating modes of a burner configuration according to the invention.

DESCRIPTION OF THE PREFERRED EMBODIMENTS

Figure 1:
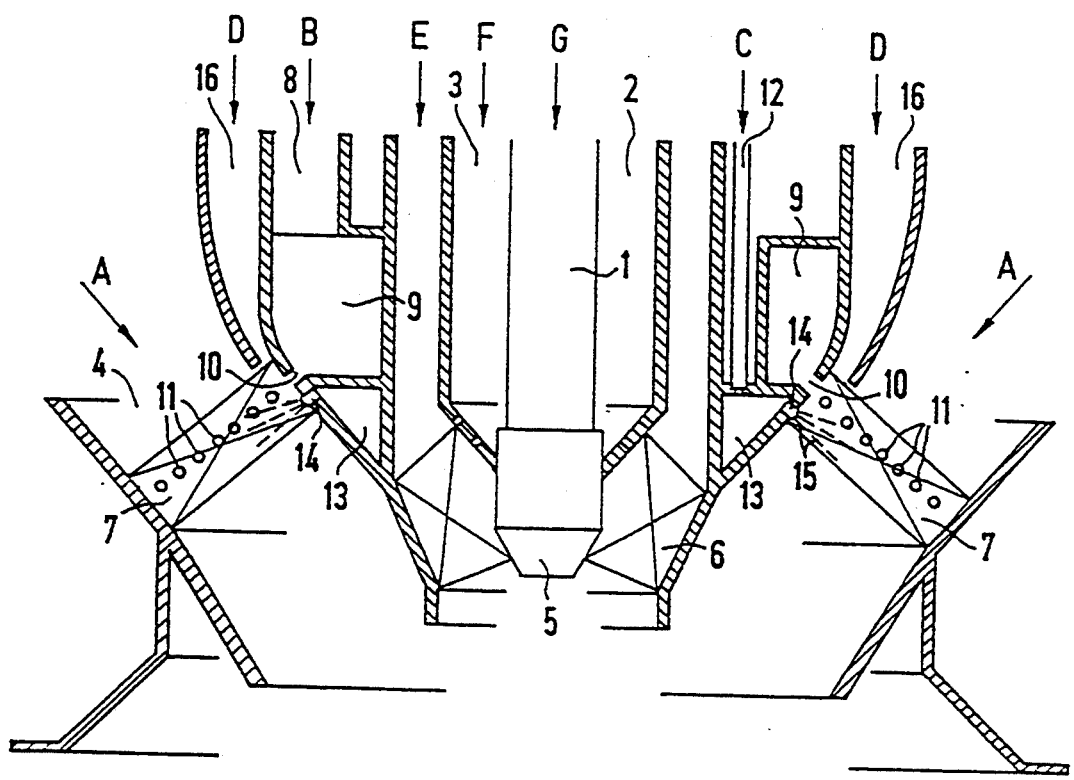
FIG. 1 is a fragmentary, diagrammatic, longitudinal axial-sectional view of a virtually rotationally symmetrical configuration of a preferred exemplary embodiment of the invention.

Referring now to the figures of the drawing in detail and first, particularly, to FIG. 1 thereof, there is seen a diagrammatic, longitudinal axial section through a burner configuration of the invention, with European Patent Nos. 0 276 696 B1 and 0 193 838 B1 being expressly incorporated by reference, to the extent that not absolutely crucial details of the configuration are involved. It should be noted that the configuration of the prior art in European Patent No. 0 276 696 B1 is altered by an advantageous modification and expansion by means of an annular conduit 16 and by shifting outlet nozzles for natural gas to a swirl vane system.

The burner configuration, which can be used in the combustion chamber of a gas turbine system for instance, optionally in combination with a plurality of identical configurations, includes an inner part, which is a pilot burner system, and an outer part that is concentric with it, which is a main burner system. Both systems are suitable for operation with gaseous and/or liquid fuels in an arbitrary combination. The pilot burner system includes a central oil delivery 1 (for a medium G) and an internal gas delivery conduit 2 (for a medium F) disposed concentrically around it. The internal gas delivery conduit 2 is in turn surrounded by a concentrically disposed inner air delivery conduit 3 (for a medium E). In or at this conduit 3, there may be a suitable ignition system, for which many possible embodiments are known and which need not be described in detail herein. The central oil delivery 1 has an oil nozzle 5 at its end, and the inner air delivery conduit 3 has a system of swirl vanes 6 in its end region. The pilot burner system 1, 2, 3, 5, 6 may be operated in a manner that is known per se.

The main burner system includes an outer annular-conduit air delivery system 4 that is disposed concentrically to the pilot burner system and extends obliquely toward it. This annular-conduit air delivery system 4 is likewise provided with a swirl vane system 7. The swirl vane system 7 includes hollow vanes with outlet nozzles 11 in a flow cross section of the annular-conduit air delivery system 4 (for a medium A). These nozzles are fed from a delivery line 8 and an annular conduit 9 through openings 10 for a medium B. In addition, the burner has a delivery line 12 for a medium C that discharges into an annular conduit 13, which has outlet nozzles 14 for the medium C in the region of or below the swirl vane system 7. A spray stream 15 of the medium C is also shown diagrammatically in the drawing. According to the invention, the burner additionally has the annular or further coal gas delivery conduit 16 (for a medium D). This conduit 16 discharges just above the swirl vane system 7 having the outlet nozzles 11, into the outer annular-conduit air delivery system 4, specifically on the inside thereof, so that in principle the two together form a diffusion burner. In this respect, it is important that in operation with the medium B, for instance natural gas, it is not possible to recirculate this medium at edges or into the coal gas delivery conduit 16, which could impair the operational reliability. Moreover, the coal gas delivery conduit 16 should not impede the flow below its entry, in order to preserve unchanged the good combustion properties for the media B and C. If the coal gas delivery conduit 16 were to discharge below the outlet nozzles 11 for the medium B or the outlet nozzles 14 for the medium C, the result would be a widening of the cross section at this point and a hindrance to the peripheral flow, both of which would be undesirable. The configuration of the coal gas delivery conduit 16 and of the hollow vanes in the form of the swirl vane system 7 according to the invention, requires only slight modifications of the burner system of the prior art and can therefore be structurally achieved at little effort or expense.

The table in FIG. 2 shows the options available for the selection of media and thus for various operating modes of the burner configuration. It may be operated with natural gas, coal gas or some other low-BTU gas, as well as with oil, in order to achieve advantageous properties in each case for pollutant emissions. If a further reduction of pollutant emissions is desirable in one of the operating modes, then an inert substance, particularly water or steam, or optionally additional substances if desired, can optionally be delivered through the systems that are not required for fuel delivery in this operating mode. The switchover of the various delivery systems to the variously desired media may be achieved by simple multiposition fixtures, which are known in the prior art. The expense for equipment remains low even though the most environmentally favorable possible mode of combustion is achieved for each fuel. In particular, NOX emissions are minimized in all operating modes.

I claim:

1. A burner configuration, comprising:
   substantially concentrically disposed annular conduits for delivering various operating media to a combustion zone;
   an outer annular-conduit air delivery system for delivering an air flow from an inflow side to the combustion zone and substantially conically tapering towards the combustion zone;
   a plurality of outlet nozzles for admixing a fluidic operating medium in finely distributed form with the air flow; and
   a further annular conduit surrounding said annular conduits for delivering various operating media and discharging into said annular-conduit air delivery system between the inflow side and said outlet nozzles.

2. The burner configuration according to claim 1, wherein said further annular conduit discharges adjacent to said annular conduits for delivering various operating media into said annular-conduit air delivery system.

3. The burner configuration according to claim 1, wherein said further annular conduit has means for delivering a burnable gas with a low specific gross calorific value.

4. The burner configuration according to claim 3, wherein the burnable gas is coal gas.

5. The burner configuration according to claim 1, wherein said annular-conduit air delivery system and said further annular conduit form a diffusion burner for combusting low-BTU gas with air.

6. The burner configuration according to claim 1, wherein said outlet nozzles and said further annular conduit have means for preventing recirculation of the fluidic operating medium into said further annular conduit.

7. The burner configuration according to claim 1, wherein said annular-conduit air delivery system has a swirl vane system on a downstream side, and said further annular conduit discharges directly above said swirl vane system, for preventing ignition in the vicinity of said swirl vane system.

8. The burner configuration according to claim 1, including approximately concentrically disposed inner delivery conduits for delivering air and a fluidic fuel to produce a pilot flame stabilizing a flame of the entire burner configuration.

9. The burner configuration according to claim 1, wherein said outlet nozzles deliver a gaseous operating medium as the fluidic operating medium.

10. The burner configuration according to claim 9, wherein said annular-conduit air delivery system has a swirl vane system on a downstream side including hollow vanes and having a plurality of outlet nozzles for admixing a gaseous medium with the air flow.

11. The burner configuration according to claim 9, wherein said outlet nozzles have means for admixing the gaseous medium in the form of natural gas with the air flow flowing in said annular-conduit air delivery system.

12. The burner configuration according to claim 9, wherein said outlet nozzles have means for admixing the gaseous medium in the form of water vapor with the air flow flowing in said annular-conduit air delivery system.

13. The burner configuration according to claim 1, wherein said outlet nozzles deliver a liquid operating medium as the fluidic operating medium.

14. The burner configuration according to claim 13, wherein said annular-conduit air delivery system has a swirl vane system on a downstream side, and outlet nozzles for a liquid medium disposed at least as far downstream as said swirl vane system.

15. The burner configuration according to claim 13, wherein said outlet nozzles have means for admixing the liquid medium in the form of oil with the air flow flowing in said annular-conduit air delivery system.

16. The burner configuration according to claim 13, wherein said outlet nozzles have means for admixing the liquid medium in the form of water with the air flow flowing in said annular-conduit air delivery system.

* * * * *